United States Patent
Francois et al.

(10) Patent No.: US 8,804,833 B2
(45) Date of Patent: Aug. 12, 2014

(54) METHOD FOR DETERMINING A FILTER FOR INTERPOLATING ONE OR MORE PIXELS OF A FRAME

(75) Inventors: Edouard Francois, Bourg des Comptes (FR); Dominique Thoreau, Cesson Sevigne (FR); Jérôme Vieron, Rennes (FR); Aurélie Martin, Rennes (FR)

(73) Assignee: Thomson Licensing, Issy les Moulineaux (FR)

( * ) Notice: Subject to any disclaimer, the term of this patent is extended or adjusted under 35 U.S.C. 154(b) by 567 days.

(21) Appl. No.: 12/737,172

(22) PCT Filed: May 11, 2009

(86) PCT No.: PCT/EP2009/055662
§ 371 (c)(1),
(2), (4) Date: Dec. 14, 2010

(87) PCT Pub. No.: WO2009/153104
PCT Pub. Date: Dec. 23, 2009

(65) Prior Publication Data
US 2011/0080953 A1    Apr. 7, 2011

(30) Foreign Application Priority Data

Jun. 19, 2008  (EP) ..................................... 08305283

(51) Int. Cl.
*H04N 11/04* (2006.01)
*H04N 7/26* (2006.01)
*H04N 7/36* (2006.01)
*H04N 7/30* (2006.01)
*H04N 7/50* (2006.01)
*G06T 7/20* (2006.01)

(52) U.S. Cl.
CPC ....... *H04N 19/00896* (2013.01); *H04N 19/002* (2013.01); *H04N 19/00151* (2013.01); *H04N 19/00436* (2013.01); *H04N 19/00066* (2013.01); *H04N 19/0026* (2013.01); *H04N 19/00739* (2013.01); *H04N 19/00824* (2013.01); *H04N 19/0089* (2013.01); *H04N 19/0063* (2013.01); *H04N 19/00587* (2013.01); *H04N 19/00781* (2013.01); *G06T 7/2013* (2013.01)

USPC ........... 375/240.16; 375/E7.243; 375/E7.124; 375/E7.26; 375/240.29

(58) Field of Classification Search
None
See application file for complete search history.

(56) References Cited

U.S. PATENT DOCUMENTS

2004/0076333 A1    4/2004  Zhang et al.
2008/0165848 A1*   7/2008  Ye et al. ................... 375/240.13
(Continued)

FOREIGN PATENT DOCUMENTS

EP    1672930    6/2006
JP    3184487    8/1991
(Continued)

OTHER PUBLICATIONS

Author Unknown: Sony presentation/documentation: 2.2.1.4 Recursive Adaptive Interpolation Filter (RAIF). Date of presentation unknown: 7 pages Sony patent US20110188571 titled Recursive adaptive interpolation filters (RAIF), Apr. 7, 2014.
(Continued)

*Primary Examiner* — Sath V Perungavoor
*Assistant Examiner* — Dakshesh Parikh
(74) *Attorney, Agent, or Firm* — Robert D. Shedd; Jeffrey M. Navon

(57) ABSTRACT

The invention is related to a method for determining a filter for interpolating one or more pixels comprised in a frame. The proposed method comprises the step of determining the filter based on other pixels in the remainder of the frame wherein a motion vector associated with said pixels has at least one motion parameter in common with another motion vector associated with said other pixels and the filter is determined such that a quality of an interpolation of said other pixels, said interpolation being determined by help of said determined filter, reaches or exceeds the quality of any other interpolation of said other pixels determinable by help of one of different filter candidates comprised in a filter candidate set. In determining the filter solely on different other pixels of the same frame, said method for determining a filter for interpolation allows for realization of a single pass encoding framework.

15 Claims, 2 Drawing Sheets

(56) References Cited

U.S. PATENT DOCUMENTS

Figure 5:
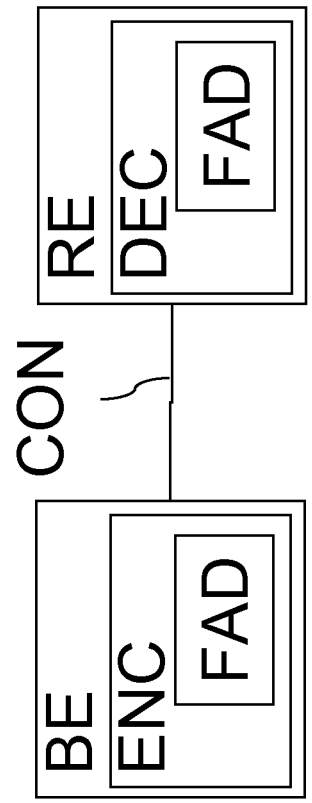

| | | | |
|---|---|---|---|
| 2008/0175322 A1* | 7/2008 | Lee et al. | 375/240.16 |
| 2009/0257493 A1* | 10/2009 | Ye et al. | 375/240.12 |
| 2009/0257500 A1* | 10/2009 | Karczewicz et al. | 375/240.16 |
| 2011/0188571 A1 | 8/2011 | Maani et al. | |

FOREIGN PATENT DOCUMENTS

| | | |
|---|---|---|
| JP | 10191353 | 7/1998 |
| JP | 2006279383 | 10/2006 |
| JP | 2010507286 | 3/2010 |
| WO | WO2008010929 | 1/2008 |
| WO | WO2008048864 | 4/2008 |
| WO | WO2008068623 | 6/2008 |

OTHER PUBLICATIONS

Kimata et al., "3D Motion Vector Coding with Block Base Adaptive Interpolation Filtler on H.264", Proceedings of International Conference on Acoustics, Speech and Signal Processing (ICASSP'03), Hong Kong, China, Apr. 6-10, 2003, pp. 633-634.

Rusanovskyy et al., "Spatial and Temporal Adaptation of Interpolation Filter for Low Complexity Encoding/Decoding", Multimedia Signal Processing, MMSP 2007, Oct. 1, 2007, pp. 163-166.

Wedi, "Adaptive Interpolation Filter for Motion and Aliasing Compensated Prediction", Proceedings of the SPIE, vol. 4671, Bellingham, VA, Jan. 21, 2002, pp. 415-422.

Dong et al., "An Iterative Method for Frame-Level Adaptive Wiener Interpolation Filters in Video Coding", Signal Processing Systems Design and Implementation, 2006, SIPS'06, Oct. 1, 2006, pp. 113-117.

Article entitled Recursive Adaptive Intepolation Filter (RAIF), Dec. 14, 2010.

Search Report Dated Dec. 1, 2009.

* cited by examiner

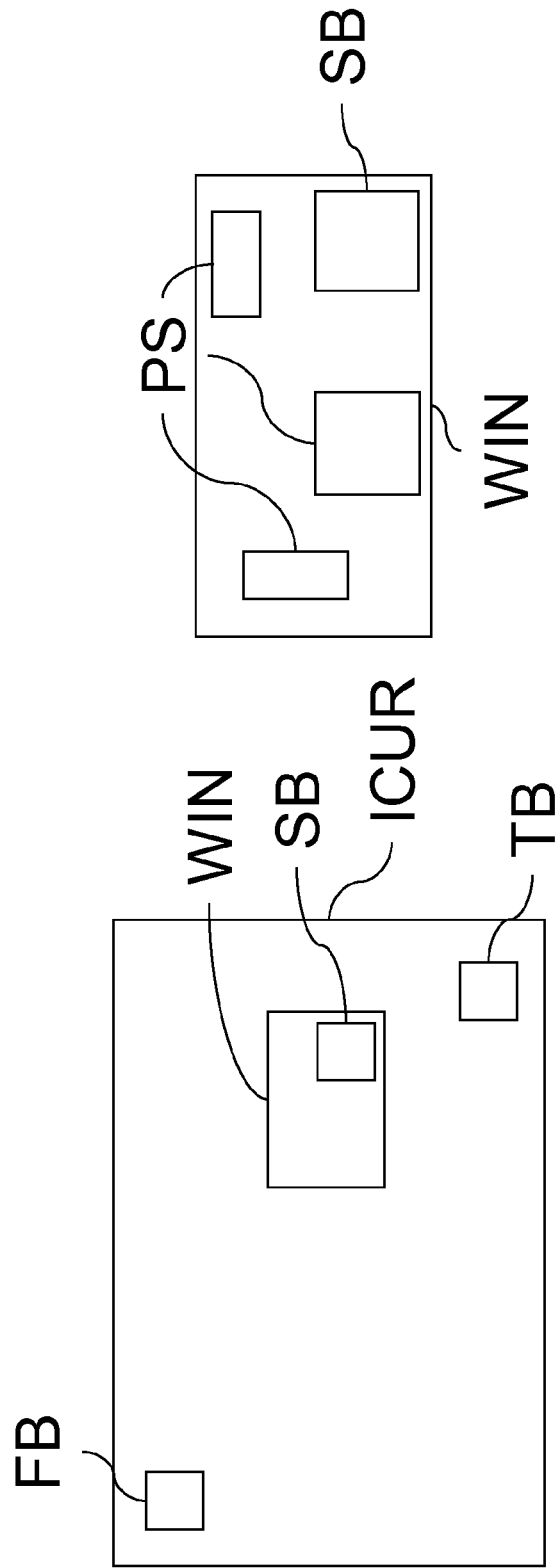

METHOD FOR DETERMINING A FILTER FOR INTERPOLATING ONE OR MORE PIXELS OF A FRAME

This application claims the benefit, under 35 U.S.C. §365 of International Application PCT/EP2009/055662, filed May 11, 2009, which was published in accordance with PCT Article 21(2) on Dec. 23, 2009 in English and which claims the benefit of European patent application No. 08305283.7, filed Jun. 19, 2008.

BACKGROUND

The invention is related to a method for determining a filter for interpolating one or more pixels comprised in a frame. The invention is further related to a method for encoding or decoding a frame, wherein said encoding or decoding method makes use of said method for determining a filter. The invention is further related to a device for encoding or decoding a frame, wherein said device is adapted for making use of said encoding or decoding method.

For coding inter pictures, some video coding schemes make use of temporal prediction by help of motion compensation based on motion vectors with fractional pixel resolution indicated by a horizontal phase and/or a vertical phase and a corresponding interpolation filter associated with said horizontal phase and/or a vertical phase.

In order to reduce the aliasing artifacts, the interpolation filters may be adaptive. The approach consists in the following steps:

In a first encoding pass, a frame is encoded with a default interpolation filter.

Based on the computed motion vectors, optimal polyphase interpolation filters are computed. That is, those interpolation filters are determined which minimize the prediction error energy between the current signal and the motion compensated interpolation of said current signal.

In a second encoding pass, the computed interpolation filter is used. The filter coefficients of the computed interpolation filter are encoded together with the frame.

U.S. patent application 2004/0076333 describes a plurality of discrete interpolation filters positioned in a search space. Based on a selected current minimum filter a search region comprising a plurality of candidate filters is identified. The candidate filter resulting in smallest prediction error is identified as current minimum filter and search is repeated until the prediction error is minimized.

There is an ongoing effort in the art towards improving interpolations and towards reducing encoding time latency and transmission bandwidth.

INVENTION

The invention engages in this effort. It proposes a method for determining a filter for interpolating one or more pixels comprised in a frame, said method comprising the features of claim 1.

That is, said method comprises the step of determining those other pixels in the remainder of the frame wherein a motion vector associated with said other pixels references the same reference frame, the same horizontal phase and/or the same vertical phase as another motion vector associated with said pixels and determining the filter based on other pixels in the remainder of the frame wherein the filter is determined such that a quality of an interpolation of said other pixels, said interpolation being determined using said determined filter, reaches or exceeds the quality of any other interpolation of said other pixels determinable using one of different filter candidates comprised in a filter candidate set.

In relaying determination of an interpolation filter solely on different other pixels comprised in the same frame and having at least one motion vector parameter in common with the pixels to-be-filtered, said method for determining a filter for interpolation allows for realization of a single pass encoding framework.

In an embodiment, said different filter candidates differ in filter type, number of filtering parameters, and/or values assigned to filtering parameters.

Said filter type may be one of median interpolation, linear interpolation, bi-linear interpolation, bi-cubic interpolation and gradient-based interpolation.

There is another embodiment, wherein said different filter candidates are associated with said reference frame, said horizontal phase and/or said vertical phase.

In yet another embodiment, said filter candidates comprise an offset associated with said horizontal phase and/or said vertical phase.

Then, the filter can be determined in accordance with changes in illumination.

If said filter candidates are one-dimensional, said determined filter may be one-dimensional filter and said method may further comprise determining a two-dimensional filter by combining said determined one-dimensional filter with another one-dimensional filter.

The separation of determining a two-dimensional filter into determination of a one-dimensional filter and combination with another one-dimensional filter allows for fast computation.

Especially, if one of said determined one-dimensional filter and said another one-dimensional filter is a vertical filter and one is a horizontal filter.

The determined two-dimensional filter is even better adapted for interpolating pixels if said another one-dimensional filter is determined by help of one of the embodiments of the method for determining a filter for interpolating pixels.

In even yet another embodiment, the qualities of interpolations of said other pixels are determined as mean square or mean absolute differences between said interpolations of said other pixels and full reconstructions of said other pixels and determining the filter comprises determining an optimum among several qualities determined for different interpolations of said other pixels.

The mean square difference is a good measure for determining quality. Instead, sum of squared differences or sum of absolute differences may be used.

The invention is also related to a method for determining a filter for interpolation of an enhancement layer block associated with a motion vector in a spatial and/or signal-to-noise scalable video coding framework. Said method comprises the steps of determining whether a co-located lower layer block is associated with a corresponding motion vector of same, respectively corresponding accuracy, wherein said corresponding motion vector has at least one motion parameter in common with said motion vector and, if so, determining the filter as a lower layer filter used in interpolation of said co-located lower layer block. At least if said corresponding motion vector does not have any motion parameter in common with said motion vector, the filter used within the enhancement layer is determined with one of the embodiments of the method for determining a filter for interpolation.

This allows for use of the inventive method in a scalable video coding framework without requiring optimization in each layer and for each block.

The invention is further related to a method for encoding or decoding a frame, said method comprises associating a motion vector with pixels of a current block of said frame and determining interpolations of the pixels of said current block using said motion vector and a filter determined with one of the embodiments of the method for determining a filter for interpolation.

Using the inventive method for encoding allows for better interpolation of blocks and in turn for better compressible residuals. Using the inventive method for decoding makes decoding independent from correct transmission of filter parameters and/or filter type.

In an embodiment of said method for encoding or decoding a frame, said other pixels—determined in performing one of the embodiments of the method for determining a filter for interpolation—are comprised in one or more other blocks of the frame, said other blocks being already encoded or decoded using the another motion vector.

This allows for encoding or decoding the frame with an adaptive interpolation filter in a single pass.

In said embodiment of said method for encoding or decoding a frame, said other blocks may be comprised in a window adjacent to or surrounding said current block.

Then, the filter is adapted to local picture content.

In a further embodiment of said method for encoding or decoding a frame, said method further comprises determining a residual of the current block and encoding the residual or decoding the current block using the residual.

The invention is yet further related to a device for encoding or decoding a frame. Said device comprises means for encoding or decoding the frame according to one of the embodiments of said method for encoding or decoding a frame.

DRAWINGS

Exemplary embodiments of the invention are illustrated in the drawings and are explained in more detail in the following description.

Figure 4:
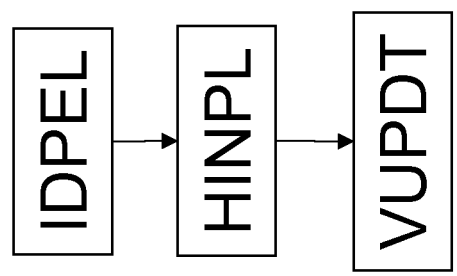
Figure 3:
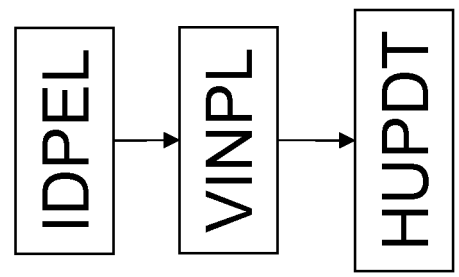

In the figures:

FIG. 1 depicts an exemplary current image with an exemplary first block and a surrounding window as well as an exemplary second and an exemplary third block, FIG. 2 depicts the window in more detail and exemplarily depicts sets of selected pixels within said window, FIG. 3 depicts an exemplary flow chart of a horizontal filter component update method, FIG. 4 depicts an exemplary flow chart of a vertical filter component update method, FIG. 5 depicts an exemplary system for transmitting or broadcasting picture data.

EXEMPLARY EMBODIMENTS

The invention proposes adapting on the fly the interpolation filter used in inter-coding. This adaptation may comprise adaptation of the number, of values of filter parameters and/or of the filter type.

Said adaptation on the fly allows for one-pass encoding with nearly optimal interpolation filters.

Interpolation filters used in inter-coding are associated with or refer to a reference picture. Furthermore, they are associated with or refer to a horizontal phase and/or a vertical phase.

An interpolation filter associated with a certain reference picture and certain horizontal and vertical phase, is used in encoding or decoding a block of a current frame if said block has a motion vector that has a fractional pixel resolution corresponding said certain horizontal and vertical phase and references a relative position in said certain reference picture.

Using the interpolation filter, an interpolated reference block is generated from a reference area in the reference picture, said reference area being determined in location by the relative position information of the motion vector and in vertical and/or horizontal extension by the dimensionality of the interpolation filter. That is, an interpolation is determined by filtering motion compensated pixels generated using the motion vector with said interpolation filter.

In the following, an interpolated reference block dislocated using the motion vector of a block towards the position of said block is referred to as a motion compensated block.

FIG. 1 depicts an exemplary current image ICUR with an exemplary first block FB, an exemplary second block SB surrounded by a window WIN and an exemplary third block TB.

If the given reference picture is referenced by a first motion vector of the first block FB a first time, a default filter is used for determining a first motion compensated block.

In an exemplary encoding framework, a first residual is determined between the first block FB and the first motion compensated block. Said first residual is transformed, for instance by a discrete cosine transform, a fast Fourier transform or a wavelet transform. The transformed residual is quantized and encoded together with the first motion vector. Further, a first full reconstruction block is formed in that the quantized residual is de-quantized, reverse transformed and combined with the first motion compensated block. In the exemplary encoding framework, the first full reconstruction block is used in filter adaptation.

In an exemplary decoding framework, the first residual is decoded from a received stream. Then, the first full reconstruction block is formed as in the encoding framework.

In a first exemplary embodiment, the default filter is updated after encoding or decoding of the first block FB. That is, several different interpolated reference blocks are generated using different interpolation filter candidates. The different interpolation filter candidates differ in their filter types and/or their filter parameters but all correspond to the horizontal and/or vertical phase of the default filter.

Each of the different interpolated reference blocks is compared with the first full reconstruction block. The updated default filter is determined as being the interpolation filter yielding the best or closest approximation of the first full reconstruction block. A suitable measure for evaluation of the degree of approximation is the distortion determined as the mean square difference or mean absolute difference, for example.

If updating of the default filter results in a significant change of the filter the first block FB may be encoded a second time wherein the updated filter is used. A two-pass encoding of the first block FB comes with the advantage of allowing for a simple default filter. Disadvantageously, a second coding pass is required.

A second block SB with a motion vector referencing the same reference frame and the same horizontal and/or vertical phase as the updated default filter is then encoded with the updated default filter. After encoding or decoding said second block SB, another update for the updated filter is determined, this time on basis of a second full reconstruction block of said second block SB.

In a second exemplary embodiment, the default filter is updated as soon as said second block SB is to-be-encoded or to-be-decoded.

In the second exemplary embodiment, interpolated reference pixel sets are generated using different interpolation filter candidates differing in their filter types and/or their filter parameters but all corresponding to the horizontal and/or vertical phase of the default filter.

Forming interpolated reference pixel sets is explained by help of FIG. 2 in the following:

In a window WIN surrounding or adjacent to the second block SB, a set PS of full reconstruction pixels is determined which comprises full reconstructions of pixels already encoded or decoded using motion vectors having the same horizontal and/or vertical phase and references the same reference picture as the motion vector of the second block SB. The set PS can be even more restricted to pixels already encoded or decoded using motion vectors which further references the same relative position in the same reference picture.

The window WIN may comprise all pixels already encoded or decoded or only some of said already encoded or decoded pixels.

For the determined set PS of full reconstruction pixels, several different interpolated reference pixel sets are generated using different interpolation filter candidates. The different interpolation filter candidates differ in their filter types and/or their filter parameters but all correspond to the horizontal and/or vertical phase of the default filter as in the first exemplary embodiment.

Each of the different interpolated reference pixel sets is compared with the set PS of full reconstruction pixels. The updated default filter is determined as being the interpolation filter yielding an optimized quality optimized with regard to a set of filter candidates. A measure of quality, i.e. the degree of approximation achieved, may be based on, for instance, the distortion compared to the set PS of full reconstruction pixels. Said degree of approximation may be determined using a mean square difference or mean absolute difference, for example.

The determined set PS of full reconstruction pixels may be empty due to the fact that no already encoded or decoded pixel was encoded or decoded using motion vectors having the same horizontal and vertical phase and referencing the same reference picture as the motion vector of the second block SB. Or, not a single pixel of the current frame has been encoded or decoded, yet.

Then, the filter remains unchanged.

As soon as a third block TB with a motion vector referencing the same reference frame and the same horizontal and/or vertical phase as the updated default filter is to-be-encoded or to-be-decoded, the updated default filter is updated, again.

So, a filter is iteratively adapted according interpolation requirements of picture content located in a vicinity of a block to which the adapted filter shall be applied.

The same filter adaptation is performed at the encoder side and at the decoder side, using both the reconstructed signal of at least a part of the current picture that is processed using its reference pictures. A different set of adaptive interpolation filters can be associated to each reference picture. Consequently these filters are not required to be encoded, which saves bandwidth. In addition, the interpolation filter can be adapted better to local picture content.

Filter Updating

The optimized interpolation filter is generally chosen as the filter minimizing a distortion measure evaluating the difference over the considered support (a just encoded block or a set PS of full reconstruction pixels depending on the chosen exemplary embodiment) between the full reconstruction picture and the motion compensated picture.

One or more of several different interpolation methods may be used, such as, for instance, a median interpolation, a linear or bi-linear interpolation, a bi-cubic interpolation or a gradient-based interpolation.

For each parameterizable interpolation method candidate type, an optimized parameterization, minimizing the distortion among the possible parameterizations of said interpolation method candidate type, is determined. For each non-parameterizable interpolation method candidate the distortion measure is determined, also.

Among the determined distortions the minimum is determined. The interpolation method candidate—with the parameterization, if applicable—which corresponds to the minimum among the determined distortions is then selected.

In another exemplary embodiment, the filter updating consists in choosing among a limited set of interpolation method candidates. For instance, the interpolation method candidates may be limited to linear interpolation filters and updating may be limited to determination of optimized, i.e. distortion measurement minimizing, coefficients.

Linear Interpolation Filters

The set of linear interpolation filters referring to a reference picture IREF consists of a set of M×M polyphase linear filters $H_{IREF,px,py}$ with px=0 ... M−1 and py=0 ... M−1. Each of the M×M polyphase linear filters $H_{IREF,px,py}$ is a 2D matrix P×Q containing linear filtering coefficients.

If $H_{IREF,px,py}$ is separable it can be written as $F_{IREF,px}$ * $G_{IREF,py}$ with $F_{IREF,px}$ and $G_{IREF,py}$ being 1D matrices with P, respectively Q, adjustable parameters.

Then, the filter updated process can be separated into a updating $F_{IREF,px}$ and updating $G_{IREF,py}$.

The process of updating $F_{IREF,px}$ works in three steps as depicted in FIG. 3:

1. Identification IDHPL of neighbouring fitting pixels;
2. Vertical signal interpolation VINPL;
3. Filter determination HUPDT.

These three steps are described in more detail below:

1. Step IDHPL. Within a window WIN adjacent to or surrounding a block to-be-encoded or to-be-decoded with horizontal phase px, a pixel set PS belonging to blocks inter-coded using reference picture $I_{REF}$, and with a motion vector with horizontal phase px is determined. Corresponding said pixel set PS there is a set of reference pixels in reference picture $I_{REF}$. Using said reference pixel set, the pixels of said pixel set PS are fully reconstructed in a blank picture resulting in a so-called full reconstruction picture $I_{REC}$ if full reconstruction has not been done already. Full reconstruction picture does not necessarily refer to a picture wherein all pixels are reconstructed but to a picture wherein those pixels which are reconstructed are fully reconstructed.

2. Step VINPL. The set of reference pixels is vertically interpolated using the vertical filters $G_{IREF,pz}$ corresponding to the vertical phases of the pixel to-be-interpolated. The vertically interpolated pixels are then placed, each, at the position of the corresponding full reconstruction pixel in a blank or empty picture. This results in a so-called vertically motion-compensated picture Ivert.

3. Step HUPDT. The vertically motion-compensated picture Ivert is further horizontally interpolated using:

$$\tilde{I}_{REF}^{h}(x, y) = O_{IREF,px} + \sum_{k=0}^{P} F_{IREF,px}(k) * I_{VERT}(x - Dx + k - [P/2], y)$$

with Dx being the integer part of the horizontal motion vector component at pixel (x,y) and [.] returning the integer part of its argument.

The included offset $O_{IREF,px}$ takes into account illumination changes. It may be Zero. In that case we have:

$$\tilde{I}_{REF}^h(x, y) = \sum_{k=0}^{P} F_{IREF,px}(k) * I_{VERT}(x - Dx + k - [P/2], y)$$

The mean-squares resolution consists in computing $F_{IREF,px}$ minimizing the energy function:

$$\sum_{(x,y)\in PS} \left(I_{REC}(x, y) - \tilde{I}_{REF}^h(x, y)\right)^2$$

which leads to the classical resolution of a linear system of P equations with P unknowns wherein one or some equations may reflect normalization constraints.

The process of updating $G_{IREF,px}$ works correspondingly as depicted in FIG. 4:

1. Step IDVPL. Within a window WIN adjacent to or surrounding a block to-be-encoded or to-be-decoded with vertical phase py, another pixel set belonging to blocks inter-coded using reference picture $I_{REF}$, and with a motion vector with vertical phase py is determined. Corresponding said another pixel set there is another set of reference pixels in reference picture $I_{REF}$. Using said another reference pixel set, the pixels of said another pixel set are fully reconstructed in a blank picture resulting in a so-called another full reconstruction picture. Again, the another full reconstruction picture does not necessarily refer to a picture reconstructed entirely but to a picture wherein those pixels which are reconstructed are fully reconstructed.

2. Step HINPL. The another set of reference pixels is horizontally interpolated using the—maybe updated—horizontal filters $F_{IREF,pz}$ corresponding to the horizontal phases of the pixel to-be-interpolated. The horizontally interpolated pixels are then placed, each, at the position of the corresponding full reconstruction pixel in a blank or empty picture. This results in a so-called horizontally motion-compensated picture $I_{HORZ}$.

3. Step VUPDT. The horizontally motion-compensated picture $I_{HORZ}$ is further vertically interpolated using:

$$\tilde{I}_{REF}^v(x, y) = O_{IREF,py} + \sum_{l=0}^{Q} G_{IREF,py}(l) * I_{HORZ}(x, y - Dy + l - [Q/2])$$

Dx is the integer part of the vertical motion vector component at pixel (x,y) and the included vertical offset $O_{IREF,py}$ may be Zero.

The mean-squares resolution consists in computing $G_{IREF,px}$ minimizing the energy function:

$$\sum_{(x,y)\in E} \left(I_{REC}(x, y) - \tilde{I}_{REF}^v(x, y)\right)^2$$

which leads to the classical resolution of a linear system of Q equations with Q unknowns wherein one or some equations may reflect normalization constraints.

Horizontal updating may be restricted to blocks to-be-encoded or to-be-decoded by a motion vector which has a vertical phase py=0. And vertical updating may be restricted to blocks to-be-encoded or to-be-decoded by a motion vector which has a horizontal phase px=0.

Signal-to-Noise-Ratio (SNR) and spatial Scalable Video Coding (SVC) is a layered video coding scheme which induces spatio-temporal and quality scalability. Within the SVC scheme, motion compensation of the current block of a higher or enhancement layer may make use of sub-pixel filters available from or determined for a co-located block in a lower layer or the base layer.

In case of SNR scalability, if the co-located lower layer block contains the same sub-pel vector as the current block, then the sub-pel filter defined for the lower layer block can be used for the enhancement layer block.

In case of spatial scalability, if the current sub-pel vector corresponds to one of those contained in the co-located blocks, then the same sub-pel filter can be respectively used for 2*sub-pel resolution (for only dyadic spatial svc), for example:
quarter pel filter->half sub pel filter,
one heighth pel filter->quarter pel filter . . .

In an exemplary embodiment depicted in FIG. 5, adaptation of an interpolation filter on the fly takes place in the same way in filter adapting device FAD comprised in an encoder ENC of a broadcasting or emitting end BE and in corresponding filter adapting device FAD of same type and parameter setting comprised in a decoder DEC of a receiving end. Then, broadcasting or transmission of filtering parameters via connection CON, which may be a cable connection or a wireless connection, becomes obsolete.

The invention has the following advantages:

By the inline determination or updating of the interpolation filters, a local adaptation of these filters is achieved.

By avoiding the transmission of filters coefficients, bandwidth dedicated to corresponding side information bits is saved, potentially resulting in coding efficiency gains.

And, by avoiding a two-pass encoding process, a reduction in complexity of the encoder is achieved.

The invention is applicable in any framework concerning video compression. The invention is especially suited but not restricted to low bit-rate application with high resolution video, e.g. HD for mobile, and super-resolution video applications like HD and the more.

The invention claimed is:

1. Method for determining a filter for interpolating one or more pixels of a frame, said method comprises the steps of
determining other pixels in the remainder of the frame wherein a motion vector associated with said one or more pixels references the same reference frame and the same fractional pixel resolution as another motion vector associated with said other pixels and
determining the filter as being a default filter in case there are no such other pixels in the remainder of the frame, or, in case there is at least one such other pixel in the remainder of the frame, determining the filter based on said other pixels such that a quality of an interpolation of said other pixels, said interpolation being determined using said determined filter, reaches or exceeds the quality of any other interpolation of said other pixels determinable using one of different filter candidates comprised in a filter candidate set.

2. Method according to claim 1, wherein
said different filter candidates differ in filter type, number of filtering parameters, and/or values assigned to filtering parameters.

3. Method according to claim 2, wherein
said filter type is one of median interpolation, linear interpolation, bi-linear interpolation, bi-cubic interpolation and gradient-based interpolation.

4. Method according to claim 1, wherein
said different filter candidates are associated with said reference frame, said horizontal phase and/or said vertical phase.

5. Method according to claim 4, wherein
said filter candidates comprise an offset associated with said horizontal phase and/or said vertical phase.

6. Method according to claim 4, wherein
said filter candidates are one-dimensional,
said determined filter is a one-dimensional filter and said method further comprises
determining a two-dimensional filter by combining said determined one-dimensional filter with another one-dimensional filter.

7. Method according to claim 6, wherein
one of said determined one-dimensional filter and said another one-dimensional filter is a vertical filter and one is a horizontal filter.

8. Method according to claim 6, wherein
said another one-dimensional filter is determined with a method.

9. Method according to claim 1, wherein
the qualities of interpolations of said other pixels are determined as mean square or mean absolute differences between said interpolations of said other pixels and full reconstructions of said other pixels and
determining the filter comprises determining an optimum among several qualities determined for different interpolations of said other pixels.

10. Method for determining a filter for interpolation of an enhancement layer block associated with a motion vector in a spatial and/or signal-to-noise scalable video coding framework, said method comprises the steps of
determining whether a co-located lower layer block is associated with a corresponding motion vector of same, respectively corresponding accuracy, wherein said corresponding motion vector has at least one motion parameter in common with said motion vector and,
if so, determining the filter as a lower layer filter used in interpolation of said co-located lower layer block and
otherwise, determining the filter within the enhancement layer with a method according to one of the claim 1.

11. Method for encoding or decoding a frame, said method comprises
associating a motion vector with pixels of a current block of said frame and
determining interpolations of the pixels of said current block using said another motion vector and a filter determined according to one of the claim 1.

12. Method according to claim 11, wherein
said other pixels determined for determination of the filter according to one of the claims 1-11 are comprised in one or more other blocks of the frame, said other blocks being already encoded or decoded by help of the motion vector.

13. Method according to claim 12, wherein
said other blocks are comprised in a window adjacent to said current block.

14. Method according to one of the claim 11, said method further comprises
determining a residual of the current block and
encoding the residual or decoding the current block by help of the residual.

15. Device for encoding or decoding a frame, said device comprises
means for encoding or decoding the frame by performing a method according to claim 11.

* * * * *